(12) United States Patent
McCarty et al.

(10) Patent No.: US 8,077,605 B2
(45) Date of Patent: Dec. 13, 2011

(54) METHOD FOR PROVIDING PATH FAILOVER FOR MULTIPLE SAS EXPANDERS OPERATING AS A SINGLE SAS EXPANDER

(75) Inventors: Christopher McCarty, Colorado Springs, CO (US); Stephen B. Johnson, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 73 days.

(21) Appl. No.: 12/384,291

(22) Filed: Apr. 2, 2009

(65) Prior Publication Data

US 2010/0064086 A1    Mar. 11, 2010

Related U.S. Application Data

(60) Provisional application No. 61/191,037, filed on Sep. 5, 2008.

(51) Int. Cl.
*H04L 12/28* (2006.01)
(52) U.S. Cl. ........................... 370/225; 370/217
(58) Field of Classification Search ................. 370/410, 370/225, 395.7; 709/220, 230; 714/9, 6; 710/74, 316; 711/148; 719/326
See application file for complete search history.

(56) References Cited

U.S. PATENT DOCUMENTS

| | | |
|---|---|---|
| 6,598,106 B1 | 7/2003 | Grieshaber et al. |
| 7,035,952 B2 | 4/2006 | Elliott et al. |
| 7,171,500 B2 | 1/2007 | Day et al. |
| 7,363,382 B1 * | 4/2008 | Bakke et al. ............... 709/230 |
| 7,437,462 B2 | 10/2008 | Marks et al. |
| 7,502,884 B1 * | 3/2009 | Shah et al. ............... 710/316 |
| 7,529,877 B2 | 5/2009 | Bashford et al. |
| 7,536,584 B2 | 5/2009 | Davies et al. |
| 7,644,168 B2 | 1/2010 | Grieff et al. |
| 7,668,925 B1 | 2/2010 | Liao et al. |
| 7,707,338 B1 | 4/2010 | Walch et al. |
| 7,721,021 B2 | 5/2010 | Johnson |
| 7,730,252 B2 | 6/2010 | Odenwald et al. |
| 2005/0071532 A1 | 3/2005 | Bakke et al. |
| 2005/0108452 A1 * | 5/2005 | Loffink .................. 710/74 |
| 2005/0138221 A1 | 6/2005 | Marushak |
| 2005/0193178 A1 | 9/2005 | Voorhees et al. |
| 2006/0031612 A1 | 2/2006 | Bashford et al. |
| 2006/0101171 A1 | 5/2006 | Grieff et al. |

(Continued)

FOREIGN PATENT DOCUMENTS

EP    1796003 A2    6/2007

(Continued)

OTHER PUBLICATIONS

Robert C. Elliott: "Serial Attached SCSI (SAS)", Working Draft American National Standard; Revision 5, Jul. 9, 2003.

(Continued)

*Primary Examiner* — Kwang B Yao
*Assistant Examiner* — Syed M Bokhari
(74) *Attorney, Agent, or Firm* — Suiter Swantz pc llo

(57) ABSTRACT

A failed link is detected between a first SAS expander and a device. A data transfer of the first SAS expander connected to the device via the failed link is re-routed to a second SAS expander connected to the device via a functional link. The first SAS expander is connected to the SAS expander via the phys of the first SAS expander and the phys of the second SAS expander for inter-expander communications.

16 Claims, 16 Drawing Sheets

U.S. PATENT DOCUMENTS

| | | | |
|---|---|---|---|
| 2006/0194386 A1 | 8/2006 | Yao et al. | |
| 2006/0230125 A1* | 10/2006 | Johnson | 709/220 |
| 2007/0005862 A1 | 1/2007 | Seto | |
| 2007/0028062 A1 | 2/2007 | Radhakrishnan et al. | |
| 2007/0070885 A1* | 3/2007 | Uddenberg et al. | 370/225 |
| 2007/0088917 A1* | 4/2007 | Ranaweera et al. | 711/148 |
| 2007/0088978 A1* | 4/2007 | Lucas et al. | 714/9 |
| 2007/0165660 A1* | 7/2007 | Fang et al. | 370/410 |
| 2007/0198761 A1 | 8/2007 | Duerk et al. | |
| 2007/0220204 A1 | 9/2007 | Nakajima et al. | |
| 2007/0276981 A1 | 11/2007 | Atherton et al. | |
| 2007/0294572 A1 | 12/2007 | Kalwitz et al. | |
| 2008/0104264 A1 | 5/2008 | Duerk et al. | |
| 2008/0120687 A1 | 5/2008 | Johnson | |
| 2008/0162773 A1 | 7/2008 | Clegg et al. | |
| 2008/0162987 A1* | 7/2008 | El-Batal | 714/6 |
| 2008/0183937 A1 | 7/2008 | Cagno et al. | |
| 2008/0244620 A1* | 10/2008 | Cagno et al. | 719/326 |
| 2008/0267192 A1* | 10/2008 | Blinick et al. | 370/395.7 |
| 2009/0006697 A1 | 1/2009 | Doherty et al. | |
| 2009/0007154 A1* | 1/2009 | Jones | 719/326 |
| 2009/0094620 A1 | 4/2009 | Kalwitz et al. | |
| 2009/0222733 A1 | 9/2009 | Basham et al. | |

FOREIGN PATENT DOCUMENTS

| | | |
|---|---|---|
| JP | 2006072636 A | 3/2006 |
| JP | 2009181317 A | 8/2009 |
| JP | 2009187399 A | 8/2009 |
| JP | 2010061663 A | 3/2010 |
| JP | 2010061666 A | 3/2010 |
| WO | WO 2007001728 A1 | 1/2007 |
| WO | WO 2007146515 | 12/2007 |
| WO | WO2008045457 | 4/2008 |

OTHER PUBLICATIONS

Microsoft: "How Network Load Balancing Works"; TechNet, Jan. 21, 2005; URL:http://technet.microsoft.com/en-us/lib (retrieved from internet Nov. 20, 2009).

Czekalski, Marty, Serial Attached SCSI Arthitecture, May 20, 2003, SCSI Trade Association, retrieved from the Internet at http://scsita.org/aboutscsi/sas/SAS__Architecture__Overview.pdf, pp. 1-13.

Lobue et al "Surveying Today's Most Popular Storage Interfaces," Dec. 2002, Computer, vol. 35, No. 12, pp. 48-55.

Na et al., "Link analysis and design of high speed storage buses in backplane and cabling environments," Jun. 1-4, 2010, 2010 Proceedings of the Electronic Components and Technology Conference (ECTC), pp. 1929-1934.

Liao et al, "Managing Access Control Through SAS Zoning," Sep. 2005, PMC-Sierra, Inc., Document No. PMC-2051469, Issue 1, pp. 1-19.

* cited by examiner

SMP REPORT MODIFIED PHY ROUTING ATTRIBUTE LIST Request

| Byte/Bit | 7 | 6 | 5 | 4 | 3 | 2 | 1 | 0 |
|---|---|---|---|---|---|---|---|---|
| 0 | \multicolumn{8}{c|}{SMP FRAME TYPE (40h)} ||||||||
| 1 | FUNCTION (CCh) |||||||| 
| 2 | ALLOCATED RESPONSE LENGTH ||||||||
| 3 | REQUEST LENGTH (01h) ||||||||
| 4 | RESERVED ||||||||
| 5 | ||||||||
| 6 | STARTING DESCRIPTOR INDEX ||||||||
| 7 | MAXIMUM NUMBER OF DESCRIPTORS ||||||||

*FIG. 11A*

SMP REPORT MODIFIED PHY ROUTING ATTRIBUTE LIST Response

| Byte/Bit | 7 | 6 | 5 | 4 | 3 | 2 | 1 | 0 |
|---|---|---|---|---|---|---|---|---|
| 0 | SMP FRAME TYPE (41h) ||||||||
| 1 | FUNCTION (CCh) ||||||||
| 2 | FUNCTION RESULT ||||||||
| 3 | RESPONSE LENGTH ((n-7)/4) ||||||||
| 4 | FIRST DESCRIPTOR INDEX ||||||||
| 5 | RESERVED ||||||||
| 6 | NUMBER OF DESCRIPTORS ||||||||
| 7 | RESERVED ||||||||
| 8 | DESCRIPTOR LENGTH ||||||||
| 9 | RESERVED ||||||||
| 10 | ||||||||
| 11 | ||||||||
| | DESCRIPTOR LIST ||||||||
| 12 | Descriptor (first) ||||||||
| 13 | ||||||||
| 14 | ||||||||
| 15 | ||||||||
| 16 | Descriptor (last) ||||||||
| 17 | ||||||||
| 18 | ||||||||
| 19 | ||||||||

*FIG. 11B*

Modified Routing Descriptor

| Byte/Bit | 7 | 6 | 5 | 4 | 3 | 2 | 1 | 0 |
|---|---|---|---|---|---|---|---|---|
| 0 | PHY IDENTIFIER ||||||||
| 1 | RESERVED |||| MODIFIED ROUTING ATTRIBUTE. ||||
| 2 | Reserved ||||||||
| 3 | Reserved ||||||||

*FIG. 11C*

| Modified Routing Attribute | Description |
|---|---|
| 3 | Self Configured (SC) |
| 4 | Table Initiator Only IN (TIOI) |
| 5 | Table Initiator Only OUT (TIOO) |
| Others | Reserved |

*FIG. 11D*

METHOD FOR PROVIDING PATH FAILOVER FOR MULTIPLE SAS EXPANDERS OPERATING AS A SINGLE SAS EXPANDER

CROSS-REFERENCE TO RELATED APPLICATIONS

The present application claims the benefit under 35 U.S.C. §119(e) of U.S. Provisional Application Ser. No. 61/191,037, filed Sep. 5, 2008, which is incorporated herein by reference. The present application is related to copending applications "COMBINING MULTIPLE SAS EXPANDERS TO PROVIDE SINGLE SAS EXPANDER FUNCTIONALITY" (application Ser. No. 12/384,289; Express Mail No. EM 260723514 US), filed on the same date as the present application by inventors Stephen B. Johnson, Timothy E. Hoglund, and Louis H. Odenwald, Jr.; "SPECIFYING LANES FOR SAS WIDE PORT CONNECTIONS" (application Ser. No. 12/384,287; Express Mail No. EM 260723505 US), filed on the same date as the present application by inventors Stephen B. Johnson and Christopher McCarty; and "SAS PAIRED SUBTRACTIVE ROUTING" (application Ser. No. 12/384,288; Express Mail No. EM 260723528 US), filed on the same date as the present application by inventors Stephen B. Johnson, William Petty, and Owen Parry. All of these applications are incorporated herein by reference.

TECHNICAL FIELD

The present disclosure generally relates to the field of Serial Attached SCSI, and more particularly to providing path failover when multiple SAS expanders operate as a single non-blocking SAS expander.

BACKGROUND

Serial Attached SCSI (SAS) is a term referring to various technologies designed to implement data transfer between computer devices. The SAS protocol is a serial successor to the parallel Small Computer System Interface. In the SAS protocol, all SAS devices are either an initiator device, a target device, or an expander device. Initiator devices are devices that begin an SAS data transfer, while target devices are the devices to which initiator devices transfer data. Together, initiator devices and target devices are known as end devices.

SAS expanders are devices that facilitate data transfer between multiple initiator devices and multiple target devices. The SAS protocol utilizes a point-to-point bus topology. Therefore, if an initiator device is required to connect to multiple target devices, a direct connection must be made between the initiator device and each individual target device in order to facilitate each individual data transfer between the initiator device and each individual target device. SAS expanders manage the connections and data transfer between multiple initiator devices and multiple target devices. SAS expanders may contain SAS devices.

SUMMARY

A method for providing path failover while combining multiple Serial Attached Small Computer System Interface (SAS) expanders to act as a single, cohesive SAS expander may include, but is not limited to: detecting a failed link between a first SAS expander and a device; and re-routing a data transfer of the first SAS expander connected to the device via the failed link to a second SAS expander connected to the device via a functional link, wherein the first SAS expander is connected to the SAS expander via the phys of the first SAS expander and the phys of the second SAS expander for inter-expander communications.

A system includes, but is not limited to: means for combining multiple SAS expanders to act as a single, cohesive SAS expander; means for detecting a failed link between a first SAS expander and a device; and means for re-routing a data transfer of the first SAS expander connected to the device via the failed link to a second SAS expander connected to the device via a functional link, wherein the first SAS expander is connected to the SAS expander via the phys of the first SAS expander and the phys of the second SAS expander for inter-expander communications.

A computer-readable medium has computer-executable instructions for performing a method for providing path failover while combining multiple Serial Attached Small Computer System Interface (SAS) expanders to act as a single, cohesive SAS expander, the method including, but is not limited to: detecting a failed link between a first SAS expander and a device; and re-routing a data transfer of the first SAS expander connected to the device via the failed link to a second SAS expander connected to the device via a functional link, wherein the first SAS expander is connected to the SAS expander via the phys of the first SAS expander and the phys of the second SAS expander for inter-expander communications.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which:

FIGS. 11A-11D are tables illustrating a vendor unique function, commands and descriptors for paired subtractive ports.

DETAILED DESCRIPTION

Figure 1:
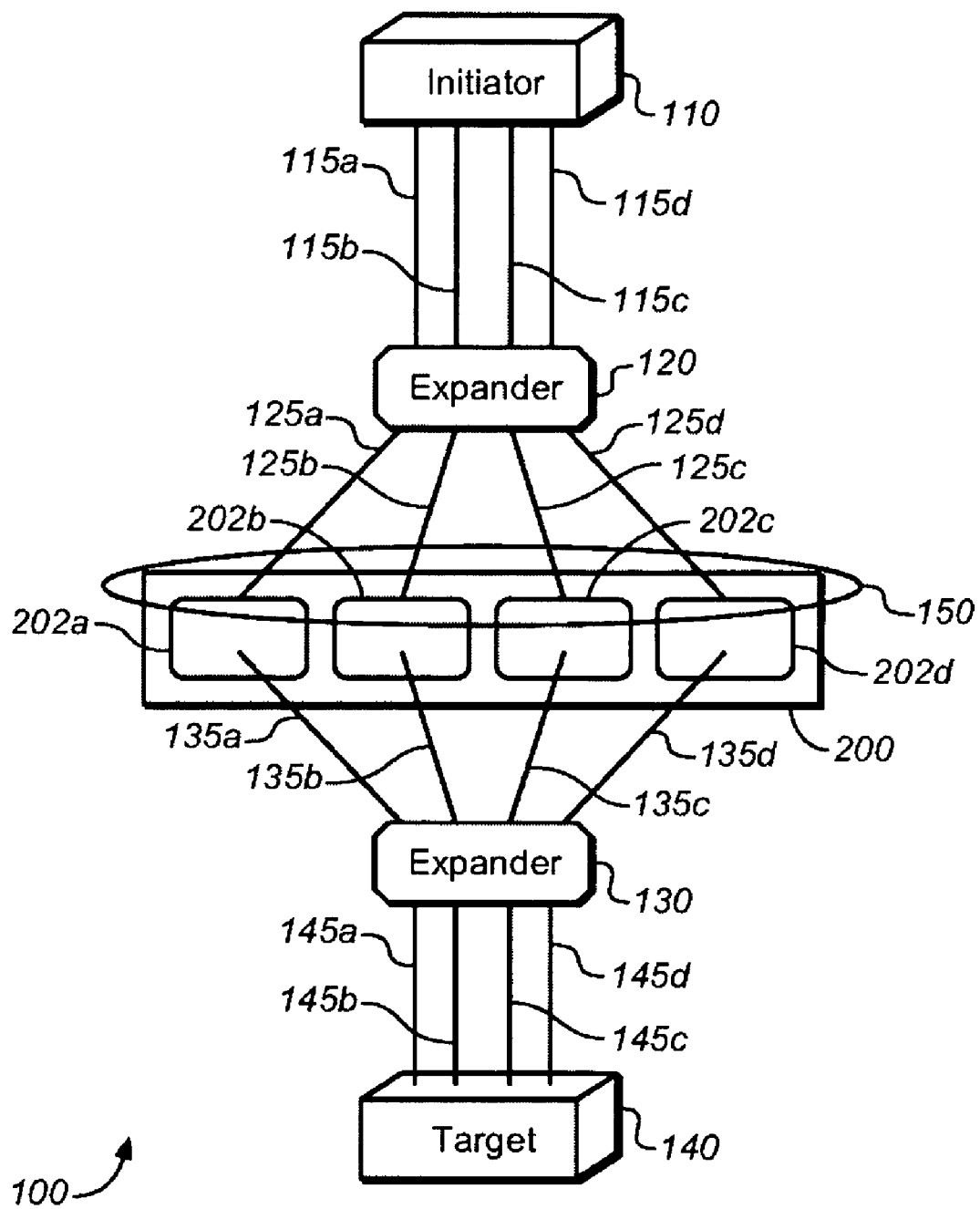
FIG. 1 is a block diagram illustrating a SAS topology illustrating a single, cohesive SAS expander.
Figure 2A:
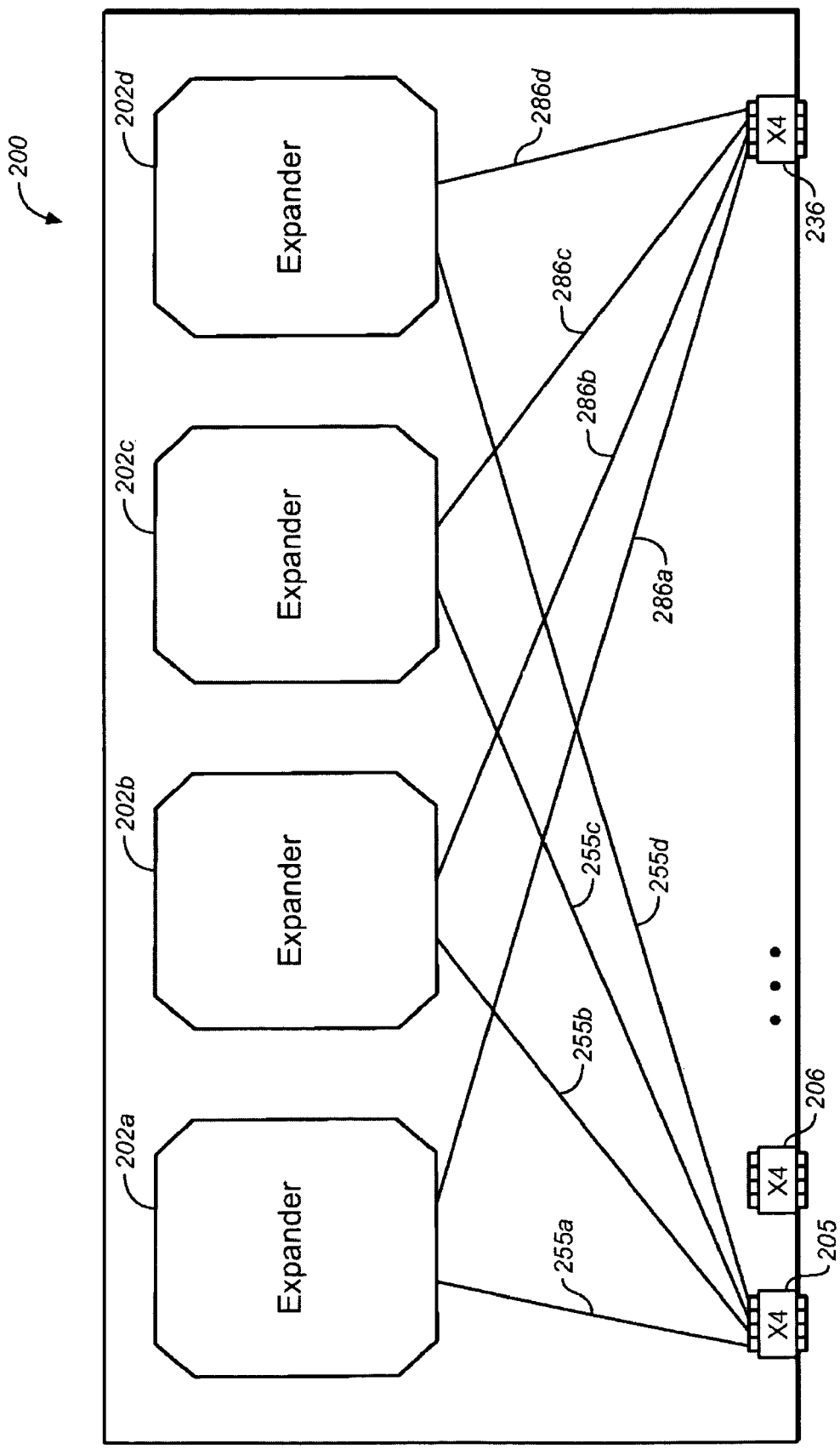
FIGS. 2A through 2E are block diagrams illustrating various configurations of a single, cohesive SAS expander.
Figure 2B:
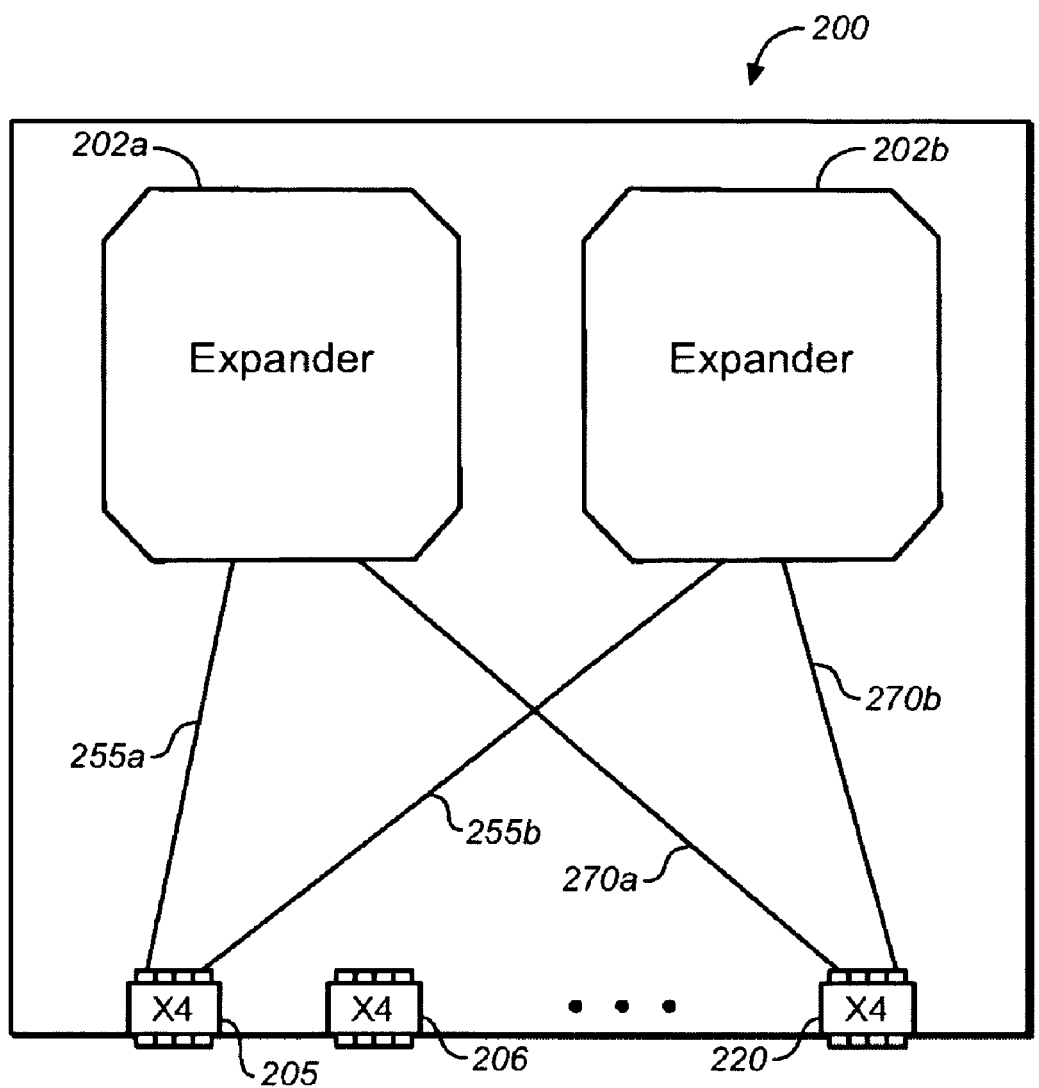
Figure 2C:
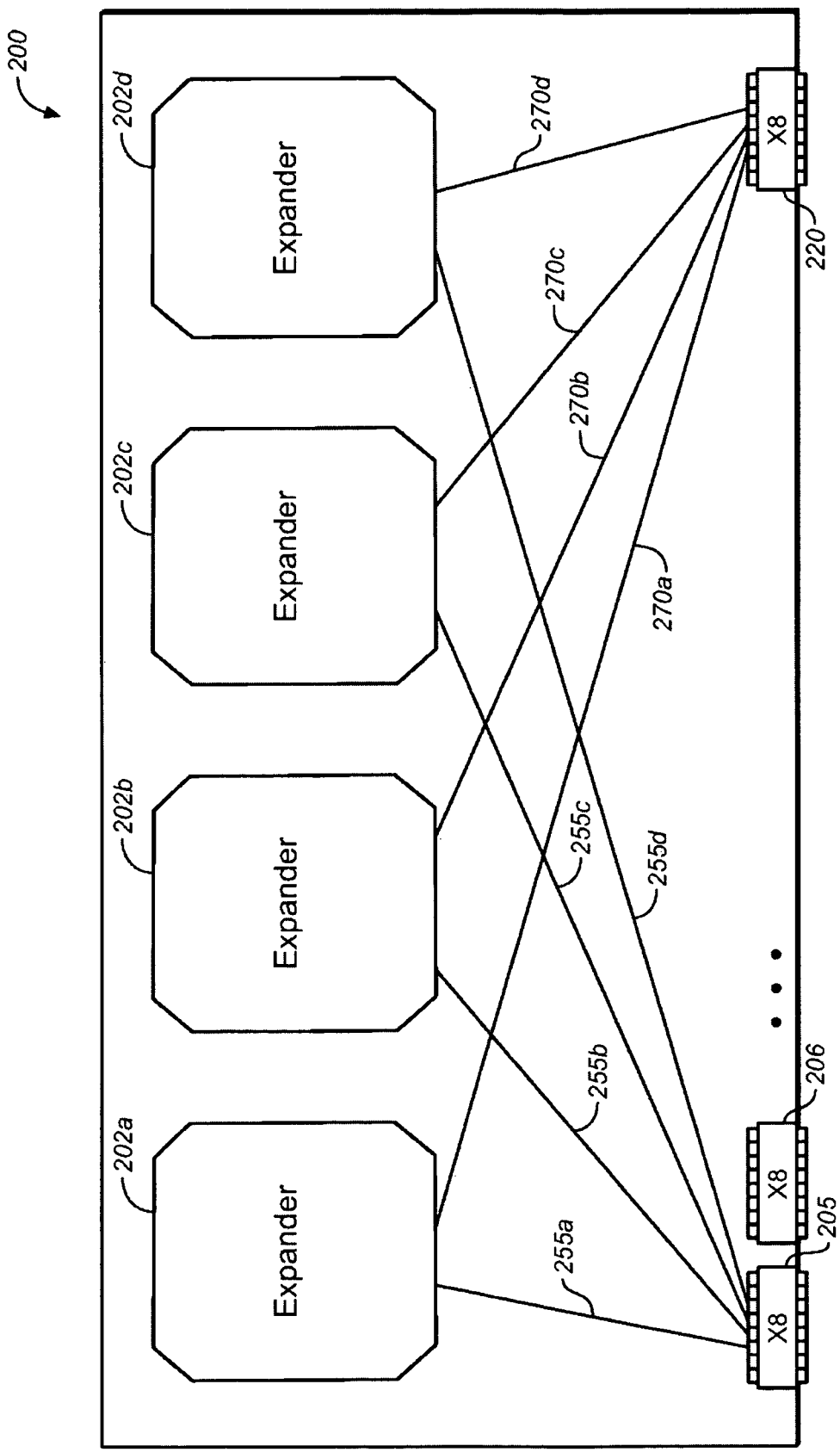
Figure 2D:
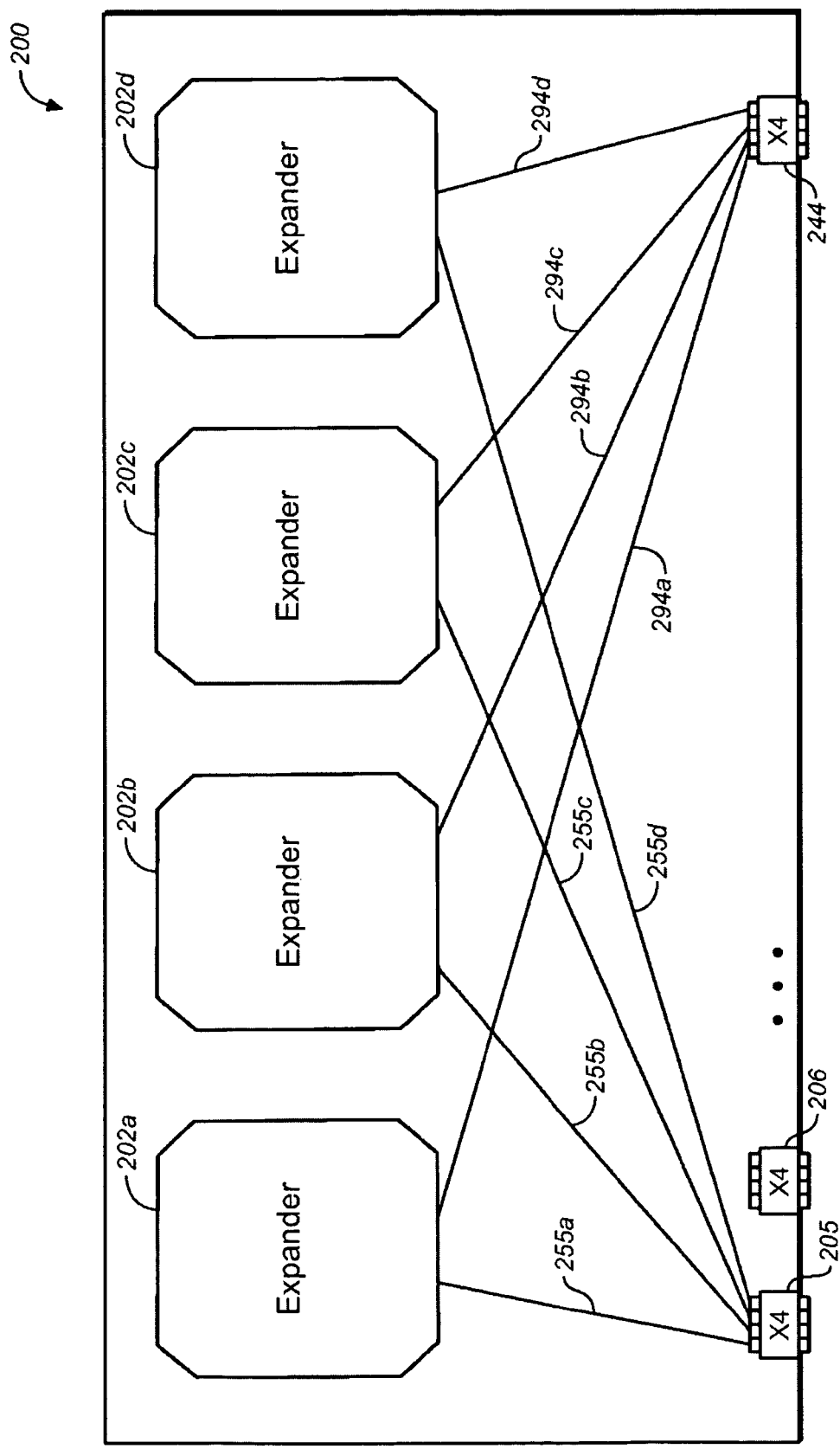
Figure 2E:
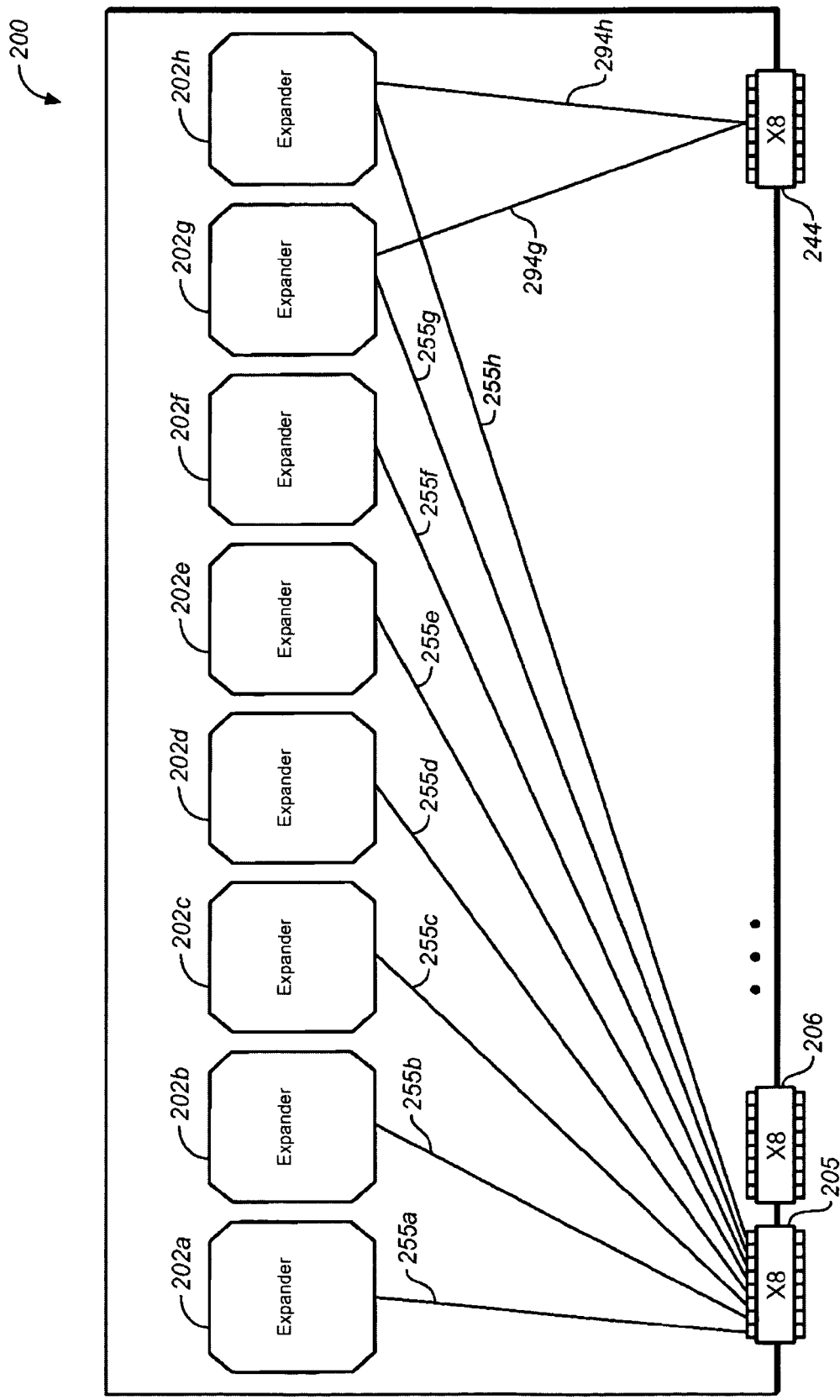

Reference will now be made in detail to the subject matter disclosed, which is illustrated in the accompanying drawings.

A SAS topology featuring a single, cohesive SAS expander in accordance with an exemplary embodiment of the present disclosure is shown. The topology 100 may include initiator 110 connected to expander 120 via narrow ports 115a ... d. Expander 120 may be connected to single, cohesive SAS expander 200 via narrow ports 125a ... d. Single, cohesive SAS expander 200 may contain a plurality of physically separate SAS expanders 202a ... d. SAS expanders 202a ... d may be configured to share an identical SAS address to combine narrow ports 125a ... d to behave as single common wide port 150. As shown in SAS topology 100, narrow ports 125a ... d may combine to make ×4-wide port 150. SAS expanders 202a ... d may be connected to expander 130 via narrow ports 135a ... d. Expander 130 may be connected to target 140 via narrow ports 145a ... d. SAS specifications require that all connections be point-to-point. However, SAS topology 100 is SAS specification compliant because wide port 150 is a true SAS wide port.

Referring to FIGS. 2A-2E, cohesive SAS expander 200 may contain a plurality of physically separated SAS expanders 202a ... h. SAS expanders 202a ... h may be connected to output ports 205-244 via links 255a ... h-294a ... h. Widely varying configurations of single, cohesive SAS expander 200 are contemplated by the present disclosure, depending on the number of SAS expanders 202a ... h, the number of ports of SAS expanders 202a ... h, the number of output ports 205-244, the width of output ports 205-244, and the number of SAS expander ports used in links 255a ... h-294a ... h.

Output ports 205-244 may be wide ports. Output ports 205-244 may be configured to share an identical SAS address. Under SAS specifications, this defines output ports 205-244 to be a single wide port of the same expander. Each of output ports 205-244 may be connected to every SAS expander 202a ... h (Not shown). The width of output ports 205-244 may depend on how many SAS expander ports are used in links 255a ... h-294a ... h to connect to each of output ports 205-244. Each of SAS expander 202a ... h may have multiple SAS expander ports connected to each of output ports 205-244. For example, if single, cohesive SAS expander 200 contains two SAS expanders 202a-h connected to each of output ports 205-244 via links 255a ... h-294a ... h using one SAS expander port, then output ports 205-244 will be a ×2 wide port. Furthermore, if single, cohesive SAS expander 200 contains two SAS expanders 202a-h connected to each of output ports 205-244 via links 255a ... h-294a ... h using two SAS expander ports, then output ports 205-244 will be a ×4 wide port. These configurations may allow for simultaneous access of any port to any other port of single, cohesive SAS expander 200 at full port bandwidth.

Figure 3:
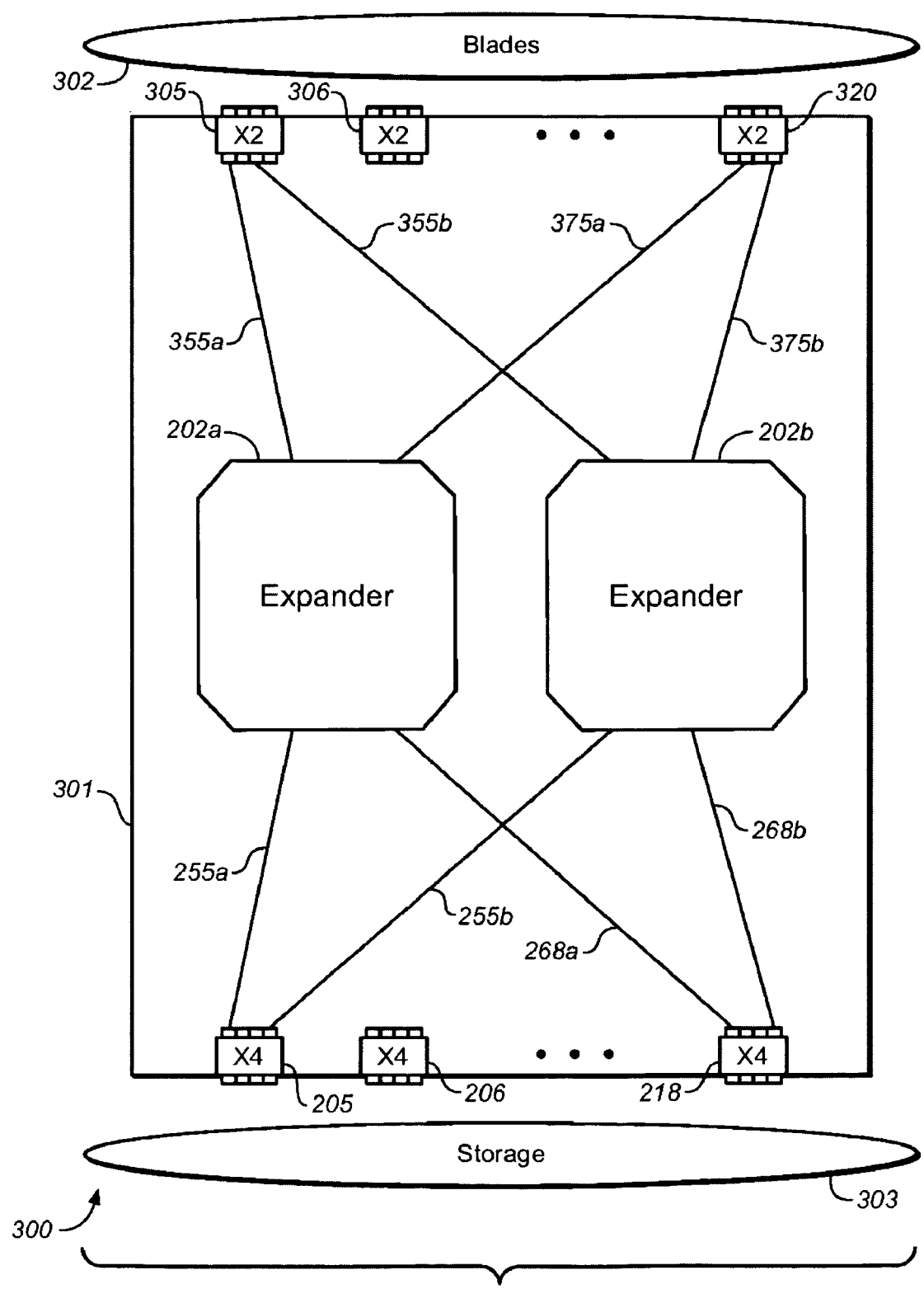
FIG. 3 is block diagram illustrating a blade center switch configuration of a single, cohesive SAS expander.

A blade center switch configuration 301 of single, cohesive SAS expander 300 is provided. Referring to FIG. 3, multiple CPU blades 302 may be connected to input ports 305-320. Input ports 305-320 may be wide ports. Input ports 305-320 may be configured to share an identical SAS address. Under SAS specifications, this defines input ports 305-320 to be a single wide port of the same expander. Each of input ports 305-320 may be connected to each of SAS expanders 202a ... b via links 355a ... b-375a ... b (Not shown). As shown in blade center switch configuration 301, input ports 305-320 are ×2 wide ports connected to two SAS expanders 202a ... b via links 355a ... b-375a ... b using one SAS expander port, but other configurations are fully contemplated by these disclosures. Each of SAS expanders 202a ... b may be connected to each of output ports 205-218 via links 255a ... b-268a ... b (Not shown). As shown in blade center switch configuration 301, output ports 205-218 are ×4 wide ports connected to two SAS expanders 202a ... b via links 255a ... b-268a ... b using two SAS expander ports, but other configurations are fully contemplated by the current disclosure. Output ports 205-218 may be connected to multiple data storage devices 303.

Figure 4:
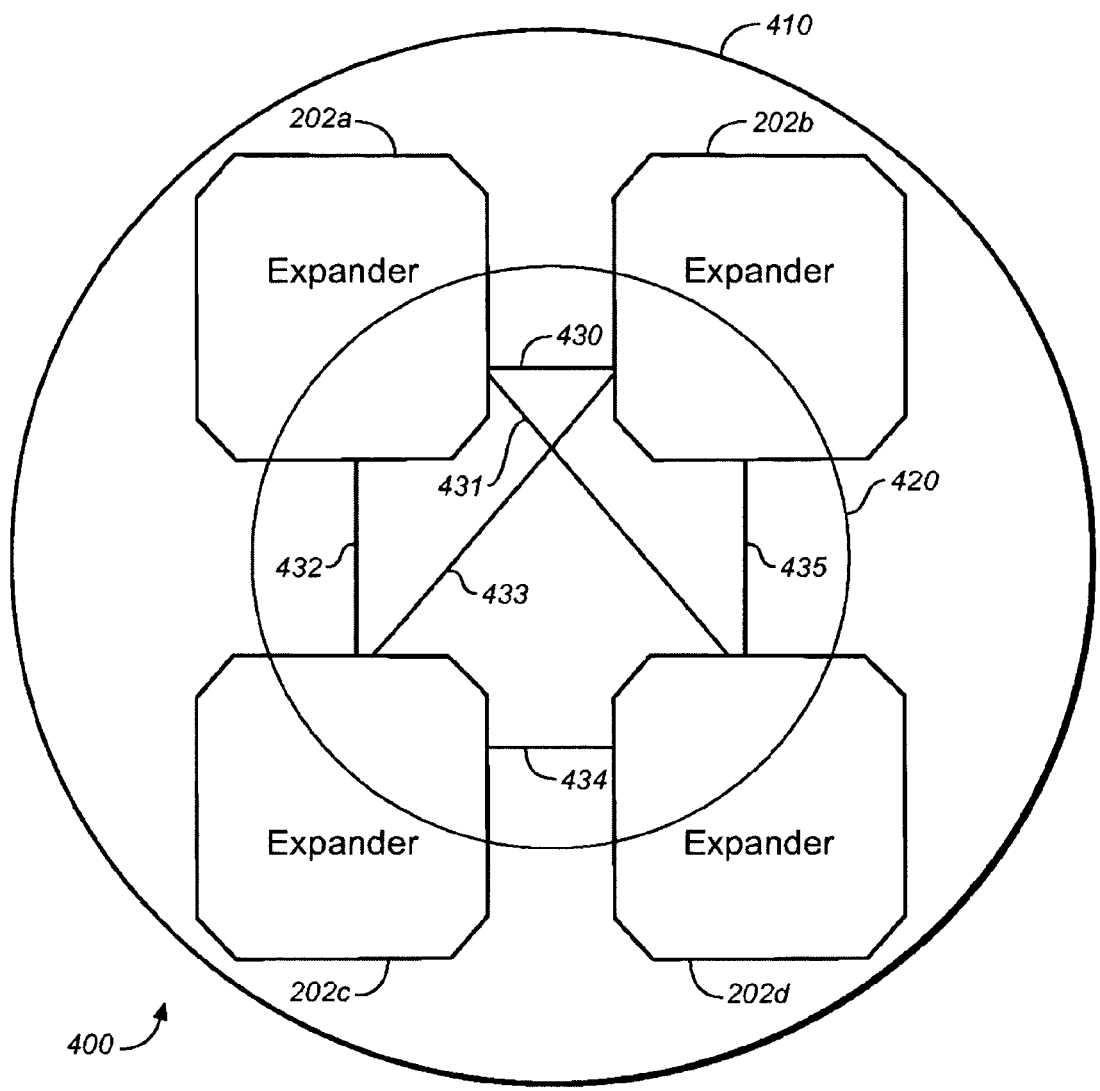
FIG. 4 is a block diagram illustrating the inter-expander links of a single, cohesive SAS expander.

SAS expanders 202a ... h may be configured to share an identical SAS address. Under SAS specifications, this defines SAS expanders 202a ... h to be a single expander. Firmware may run on each of SAS expanders 202a ... h so SAS expanders 202a ... h behave and respond as a single expander. As shown in FIG. 4, each of SAS expanders 202a ... h may be connected to each of 202a ... h via inter-expander links (IEL) 430-435. IEL 430-435 may allow SAS expanders 202a ... h to communicate and coordinate to behave and respond as a single expander. IEL 430-435 may communicate via the SAS Management Protocol (SMP) or other communication methods, such as Inter-Integrated Circuit Bus Protocol (I2C), Enhanced Parallel Port (EPP), Ethernet, shared memory, and the like. IEL 430-435 may permit the IEL domain 420 to be zoned from primary switched domain 410. Broadcasts may be disabled in IEL 430-435 to eliminate any SAS specification non-compliant loop issues. IEL 430-435 may use multiple SAS expander ports. The phys used in IEL 430-435 may be completely hidden from the primary switched domain. The numbering of the phys used in the primary switched domain of SAS expanders 202a ... h may be remapped to a single, logical numbering. IEL 430-435 may allow any combination of SAS expanders 202a ... h to fail while connectivity is maintained between any functional SAS expanders 202a ... h. Further, all input ports 305-320 and output ports 205-244 may maintain connectivity at a reduced bandwidth in the event of less than every SAS expander 202a ... h failing. SMP target processing may be handled by a single master SAS expander of single, cohesive SAS expander 200. Connection requests to single, cohesive SAS expander 200 may be routed to the single master SAS expander via IEL 430-435. SAS expanders 202a ... h may share SMP target processing.

Figure 6:
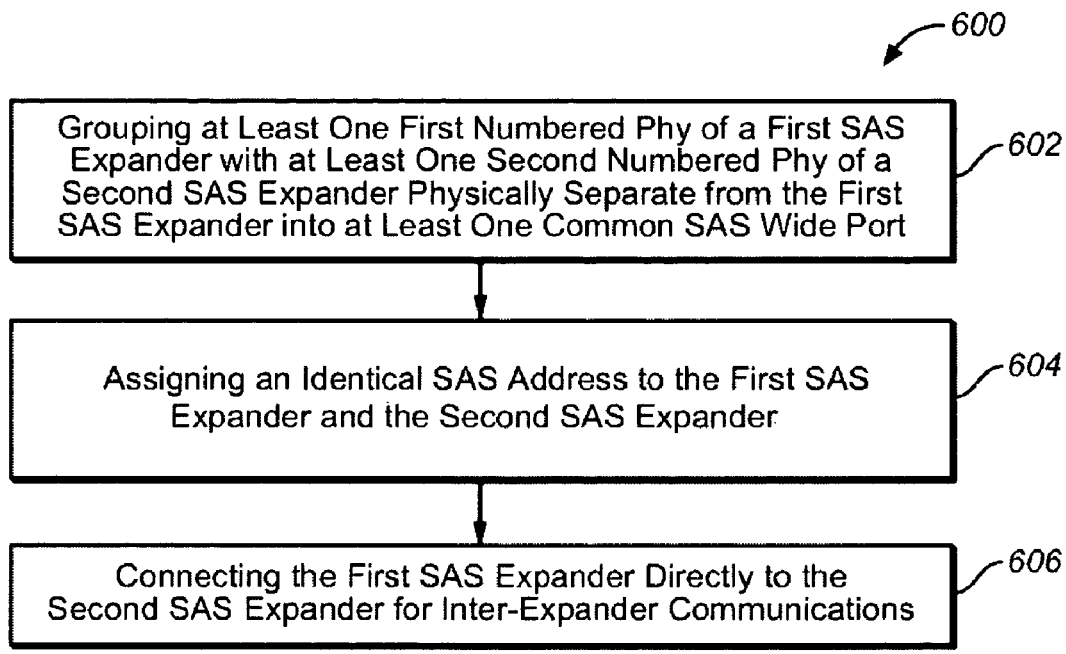
FIG. 6 is a flow diagram illustrating a method for combining multiple SAS expanders to operate as a single, cohesive SAS expander.

Referring generally to FIG. 6, a method for combining multiple SAS expanders is shown. For example, the method may implement techniques for connecting and combining SAS expanders as described below (and as shown in FIGS. 1, 2A through 2E, 3, and 4). The method 600 may include the step of grouping at least one first numbered phy of a first SAS expander with at least one second numbered phy of a second SAS expander physically separate from the first SAS expander into at least one common SAS wide port 602. For example, the grouping into at least one common SAS wide port (205-244) may include assigning an identical SAS address to the at least one common wide port (205-244).

The method 600 may further include the step of assigning an identical SAS address to the first SAS expander and the second SAS expander 604. Assigning an identical SAS address to the first SAS expander and the second SAS expander may allow the first SAS expander and the second SAS expander to behave and respond as a single, cohesive SAS expander 200. The assigning may be performed via firmware executing on the first SAS expander and the second SAS expander. Further, the phy numbering of the first SAS expander and the second SAS expander may be remapped to appear as a single, logically ordered phy numbering of a single, cohesive SAS expander. For example, a first numbered phy of the first SAS expander may be remapped to be in a first range of the single, logically ordered numbering and a second numbered phy of the second SAS expander may be remapped to be in a second range of the single, logically ordered numbering.

The method 600 may further include the step of connecting the first SAS expander directly to the second SAS expander for inter-expander communications 606. The inter-expander communications may utilize SMP communications or other communication methods, such as Inter-Integrated Circuit Bus Protocol (I2C), Enhanced Parallel Port (EPP), Ethernet, shared memory, and the like. In additional embodiments, the connection between the first SAS expander and the second SAS for inter-expander communications (430-435) may be performed via the phys of the first SAS expander and the phys of the second SAS expander. Further, the phys of the first SAS expander for inter-expander communications and the phys of the second SAS expander for inter-expander communications may be hidden from the primary switched domain (410) of the single, cohesive SAS expander. At least two phys of the first SAS expander and at least two phys of the second SAS expander may be used for inter-expander communications between the first SAS expander and the second SAS expander. Further, if at least one SAS expander within the single, cohesive SAS expander remains operational (ex.— such as during an SAS expander failure), all common SAS wide ports remain operational, with all common SAS wide ports operating at a reduced bandwidth.

Figure 5:
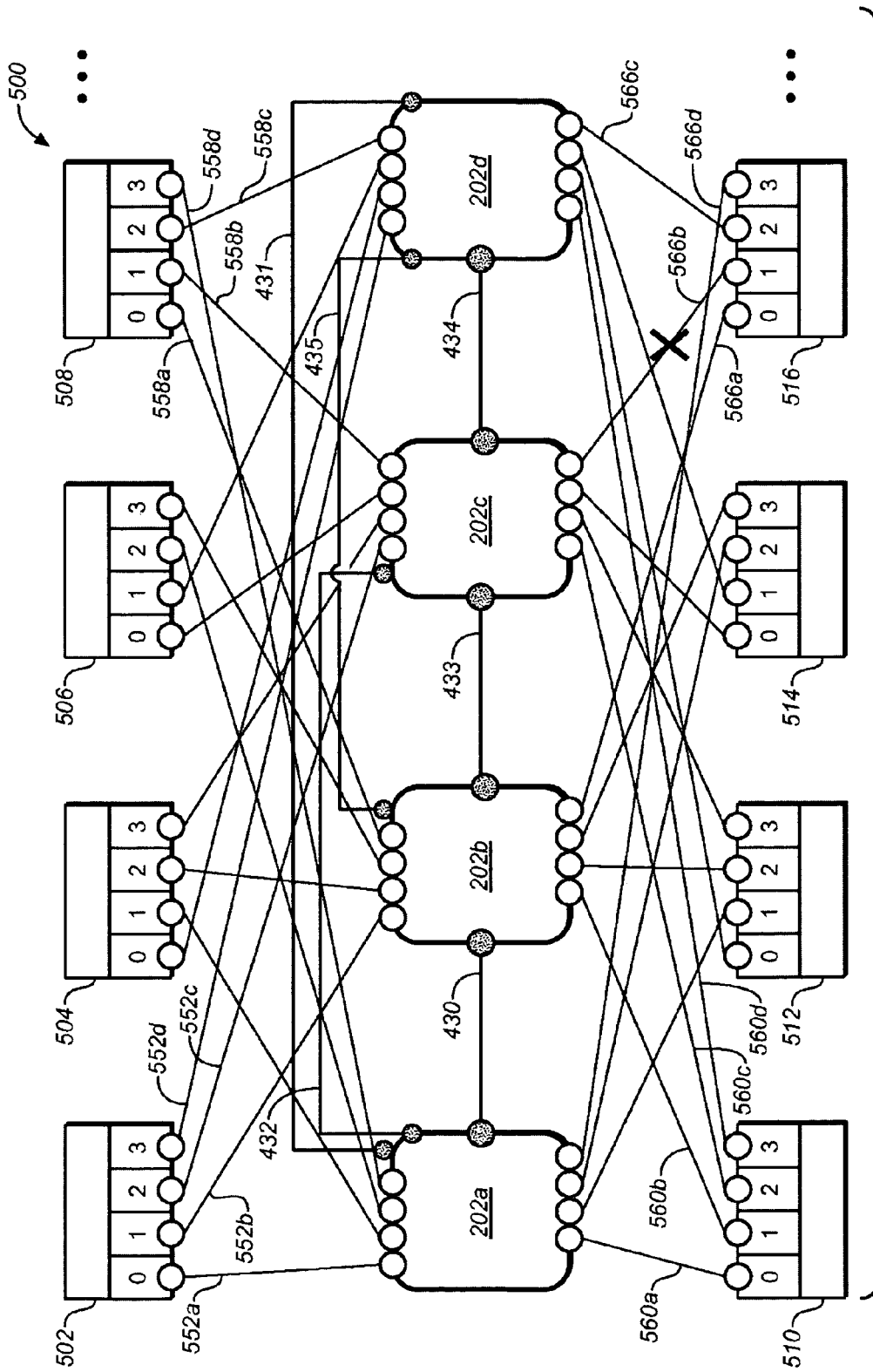
FIG. 5 is a block diagram illustrating a failed internal link within a single, cohesive SAS expander.

The single, cohesive SAS expander 500 may be configured to provide path failover when an internal link fails within the single, cohesive SAS expander. Referring to FIG. 5, and as described above, input ports 502-508 may be connected to each SAS expanders 202*a* . . . *d* via links 552*a* . . . *d*-558*a* . . . *d*. Further, input ports 502-508 may be SAS wide ports. Output ports 510-516 may be connected to each SAS expanders 202*a* . . . *d* via links 560*a* . . . *d*-566*a* . . . *d*. Further, output ports 510-516 may be SAS wide ports. Each of SAS expanders 202*a* . . . *d* may be connected to each other via SAS expander ports for inter-expander communications. As shown in single, cohesive SAS expander 500, the link 566*b* between SAS expander 202*c* and output port 516 may fail. For example, a physical defect may cause link 566*b* to fail. As a further example, link 566*b* may fail to due a logical problem.

The data transfer intended to be transmitted via failed link 566*b* may be re-routed to another SAS expander connected to output port 516. This data transfer may be re-routed to another SAS expander via the phys used for inter-expander communications between the SAS expanders. As shown in single, cohesive SAS expander 500, the data transfer between SAS expander 202*c* and output port 516 via failed link 566*b* may be re-routed through SAS expander 202*d* via inter-expander communications link 434. From SAS expander 202*d*, the data transfer may be re-routed to output port 516 via link 566*c*. Thus output port 516 may receive the data transfer as originally intended, but may receive the data transfer on a different phy. Further, if SAS expander 202*d* already has an active link to output port 516, SAS expander 202*c* may respond to the SAS initiator with an arbitration in progress (AIP), as provided via SMP. The SAS initiator may attempt the data transfer at a later time after receiving an AIP or OPEN REJECT (RETRY) SMP response from SAS expander 202*c*.

In a further aspect of the present disclosure, firmware executing on the SAS expanders may reprogram the SAS expander route tables to re-route connections through inter-expander communications links (430-435) instead of through the failed links. Further, a SAS initiator connected to the single, cohesive SAS expander may learn that link 566*b* has failed by receiving a CHANGE primitive. For example, SMP provides a CHANGE primitive. The SAS initiator may then perform a SAS Discovery, for example, as provided via SMP. Further, the SAS initiator may note the number of remaining active connections to the target, and may only initiate a number of simultaneous data transfers equal to the number of remaining active connections to the target.

Figure 7:
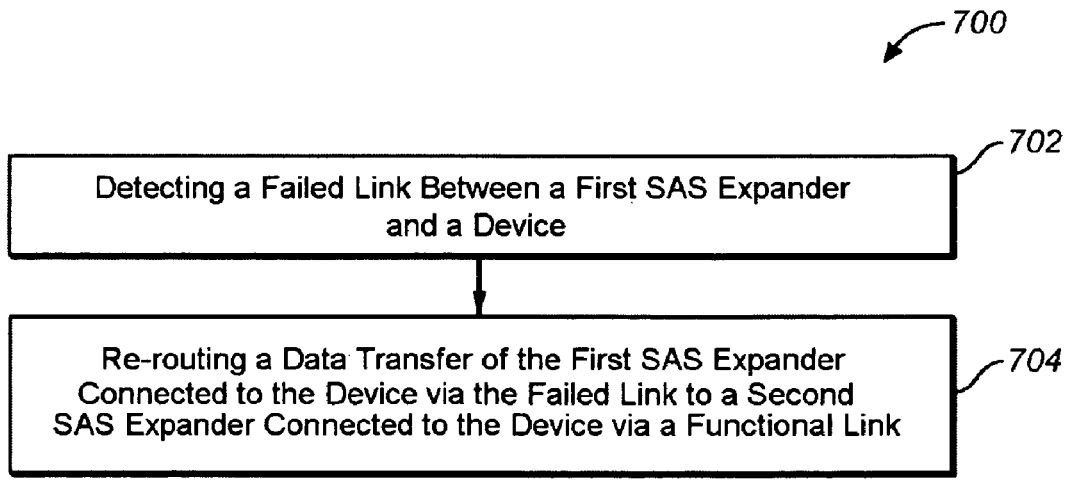
FIG. 7 is a flow diagram illustrating a method for providing path failover when a link fails within a single, cohesive SAS expander

Referring generally to FIG. 7, a method for providing path failover while combining multiple SAS expanders to act as a single, cohesive SAS expander is shown. For example, the method may implement techniques as shown in FIG. 5. In a current embodiment of the current invention, the method 700 includes the step of detecting a failed link between a first SAS expander and a device 702. For example, the detected failed link may fail due to a physical problem. The detected failed link may fail due to a logical problem.

The method 700 may further include the step of re-routing a data transfer of the first SAS expander connected to the device via the failed link to a second SAS expander connected to the device via a functional link 704. For example, the failed link of the single, cohesive SAS expander may fail due to a physical problem within the failed link. In another example, the failed link may fail due to a logical problem. The first SAS expander may be connected to the second SAS expander via the phys of the first SAS expander and the phys of the second SAS expander for inter-expander communications. In further embodiments, the re-routing a data transfer of a SAS expander connected to a device via the failed link to a second SAS expander connected to the device via the functional link may occur via the phys of the first expander for inter-expander communications and the phys of the second SAS expander for inter-expander communications. In exemplary embodiments, the re-routing a data transfer may include reprogramming a route table of the first SAS expander to re-route the data transfer from the failed internal link to the links between via the phys of the first expander for inter-expander communications and the phys of the second SAS expander for inter-expander communications. For example, the reprogramming of the route table of the first SAS expander may be performed via firmware executing on the first SAS expander.

The step of re-routing data transfers from a failed link within the single, cohesive SAS expander to a second SAS expander via a link for inter-expander communications may not indicate to SAS initiators and SAS targets connected to the single, cohesive SAS expander that such re-routing is occurring. However, if the second SAS expander currently has an active link to the device and data is re-routed from the failed link to the second SAS expander, the first SAS expander connected to the device via the failed link may respond with an AIP response. In such a case, a SAS initiator receiving the AIP response may retry the data transfer at a later time. A SAS initiator connected to the single, cohesive SAS expander may be notified of the failed link via receiving a CHANGE primitive. Upon receiving a CHANGE primitive, the SAS initiator may perform a SAS Discovery. For example, SMP provides a SAS Discovery, which includes a SAS Discover and a SAS Discover response.

Figure 8:
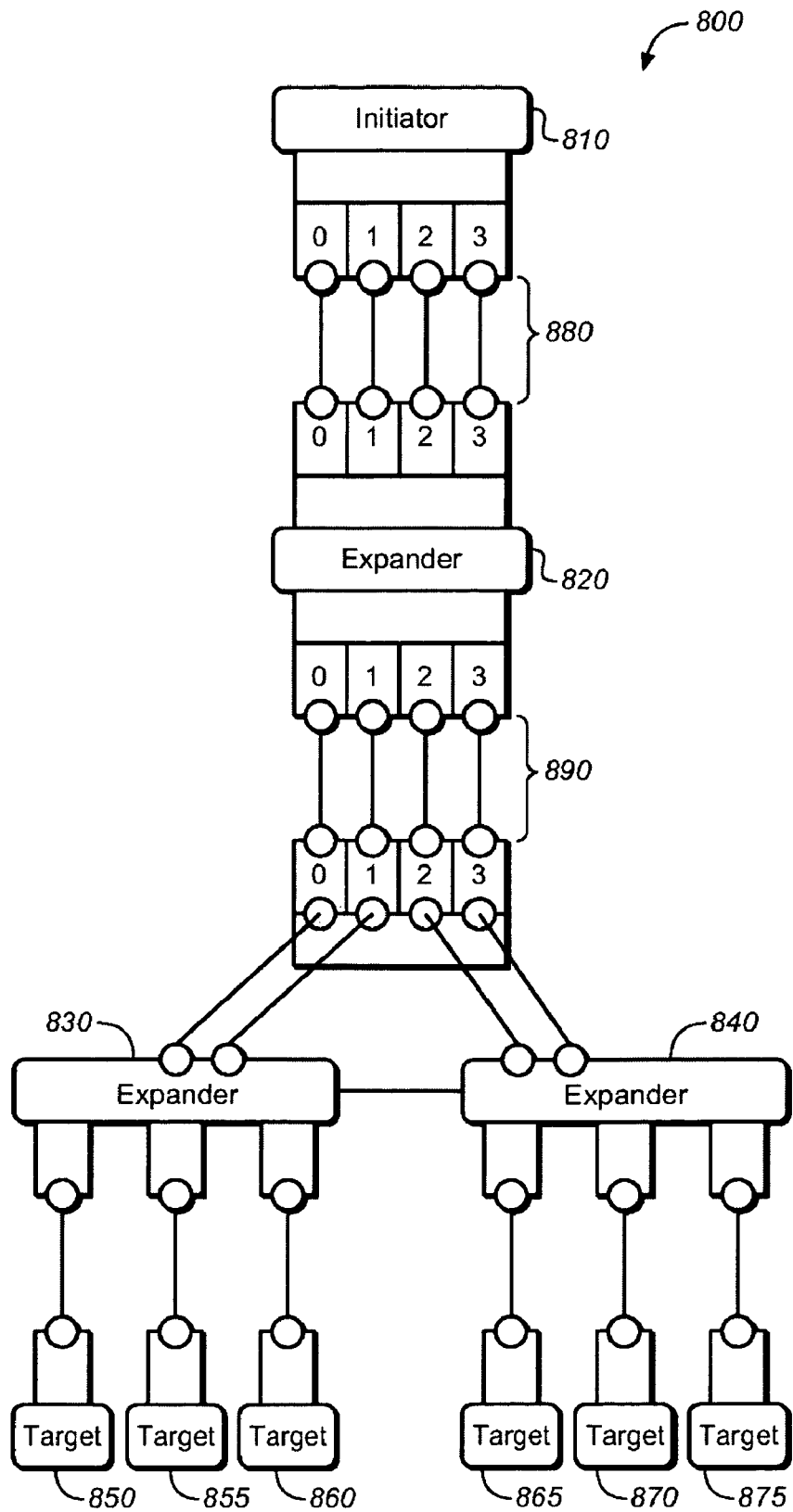
FIG. 8 is a block diagram illustrating selecting lanes of SAS wide ports for a data connection with a single, cohesive SAS expander.

A SAS-initiator specified data connection configuration 800 is provided. Referring to FIG. 8, SAS initiator 810 may be connected to SAS expander 820 via SAS wide port 880. At least one phy of SAS expander 830 and at least one phy of SAS 840 may be combined in common SAS wide port 890. In order for SAS expander 830 and SAS expander 840 to operate as a single, cohesive SAS expander, SAS expander 830 may share an identical SAS address with SAS expander 840. SAS expander 820 may be connected to SAS expander 830 and SAS expander 840 via common SAS wide port 890. SAS expander 830 may also be directly connected to SAS expander 840 via an inter-expander communications link via the phys of SAS expander 830 and the phys of SAS expander 840. SAS expander 830 and SAS expander 840 may not operate as a single, cohesive SAS expander, and may be in a cascaded configuration. A plurality of SAS targets 850-875 may be connected to SAS expander 830 and SAS expander 840 via a SAS narrow port. The number of SAS targets 850-875 may be greater than the number of phys on SAS expander 830 or SAS expander 840. For example, SAS targets 850-875 may be a hard disk array such as a Just a Bunch Of Disks (JBOD) SAS array.

SAS initiator 810 may specify the lanes of wide ports 880, 890 to be used to create a data connection from SAS initiator 810 to one of SAS targets 850-875. Specifying the lanes of wide ports 880, 890, may be used for fairness control, where some lanes of wide ports 880, 890 may be used to access SAS targets 850-875 and other lanes of wide ports 880, 890 may be used to pass through to other parts of a SAS configuration. SAS initiator 810 may further specify the lanes within an OPEN frame of a connection request. Such an OPEN frame may be provided via an SMP connection request. SAS initiator 810 may have learned the optimal lanes for a data connection from SAS initiator 810 to one of SAS targets 850-875 via a performing a standard SAS discovery process. SAS expander 830 and SAS expander 840, along with SAS targets 850-875 may be configured to respond via the SMP Discover response with the optimal lanes for a data connection from SAS initiator 810 to one of SAS targets 850-875. Each SAS expander in the data connection between SAS initiator 810 and one of SAS targets 850-875 may check the OPEN frame of the connection request from SAS initiator 810 for the allowed lanes for the data connection and only makes a data connection on those specified lanes.

Figure 9:
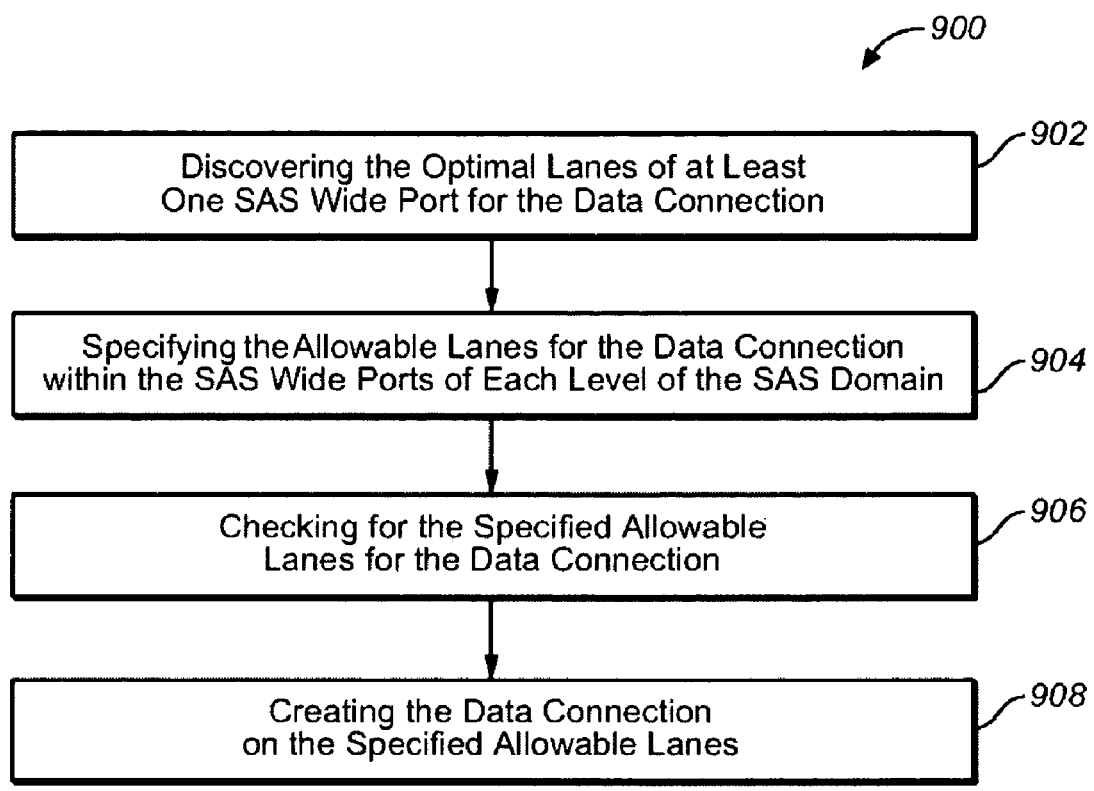
FIG. 9 is a flow diagram illustrating a method for specifying lanes of SAS wide ports for a data connection with a single, cohesive SAS expander.
Figure 10:
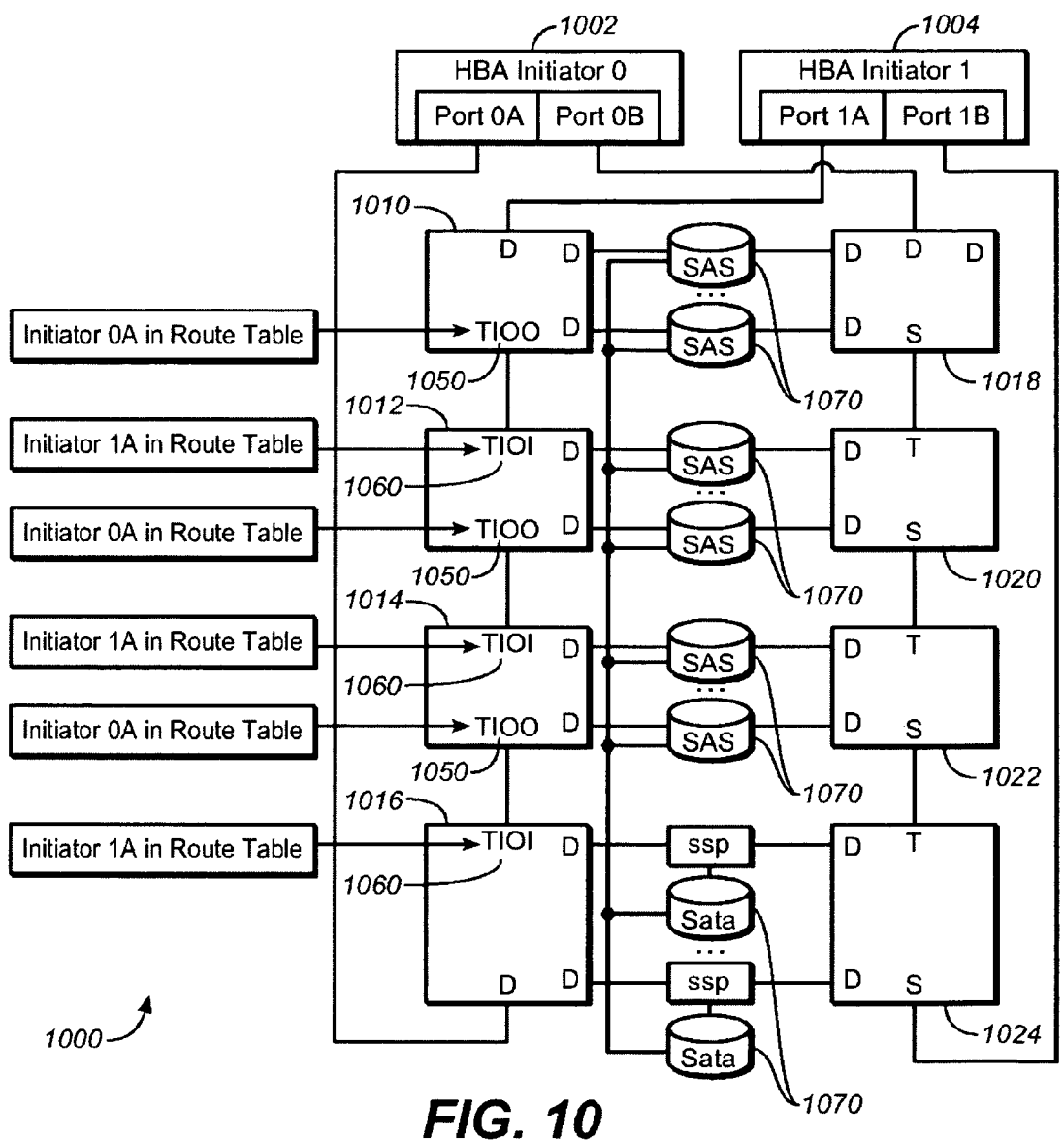
FIG. 10 is a block diagram illustrating a cascaded SAS topology configured for performing paired subtractive routing.

Referring generally to FIG. 9, a method for specifying allowable lanes of a SAS wide port for a data connection between a SAS initiator and a SAS target in a SAS domain in accordance with an exemplary embodiment of the present disclosure is shown. In a current embodiment of the present disclosure, method 900 includes the step of discovering the optimal lanes of at least one SAS wide port for the data connection 902. For example, SAS initiator 810 may discover the optimal lanes for the data connection via performing a standard SAS discovery process. Further, the SMP Discover response may be used to communicate the optimal lanes for the data connection to SAS initiator 810.

The method 900 may further include the step of specifying the allowable lanes for the data connection within the SAS wide ports of each level of the SAS domain 904. For example, the allowable lanes for the data connection may be specified via a SAS initiator connection request. The allowable lanes for the data connection may further be specified within an OPEN frame of a SAS initiator connection request.

The method 900 may further include the step of checking for the specified allowable lanes for the data connection 906. For example, when a SAS expander (820-840) receives an OPEN frame of a SAS initiator connection request, the SAS expander may check the OPEN frame for the specified allowable lanes for the data connection.

The method 900 may further include the step of creating the data connection of the specified allowable lanes 908. For example, a SAS expander may create the data connection on the specified allowable lanes. Further, the SAS expander may create the data connection after checking the OPEN frame of a SAS initiator connection request for the specified allowable lanes.

A SAS cascaded topology is provided which utilizes paired subtractive routing. In order to utilize paired subtractive routing, SAS devices in SAS topology 1000 may reference a vendor unique SMP Function. SAS Initiators 1002-1004 may check SMP REPORT MANUFACTURER INFORMATION response, as provided via SMP, to see if the vendor unique SMP Function is supported. If so, SAS Initiators 1002-1004 may use the vendor unique SMP Function to request a list of the phys of SAS expanders 1010-1024 which have a modified routing attribute for utilizing paired subtractive routing. For example, SAS Initiators 1002-1004 may issue SMP REPORT MODIFIED PHY ROUTING ATTRIBUTE LIST Request 1100 to each of SAS expanders 1010-1024 of SAS topology 1000. Upon receiving SMP REPORT MODIFIED PHY ROUTING ATTRIBUTE LIST Request 1100, each of SAS expanders 1010-1024 may respond with a list of the phys with modified routing attributes via SMP REPORT MODIFIED PHY ROUTING ATTRIBUTE LIST Response 1120. In operation, SMP REPORT MODIFIED PHY ROUTING ATTRIBUTE LIST Response 1120 may contain several Modified Routing Descriptors 1140. Each of Modified Routing Descriptor 1140 may indicate a single phy of SAS expanders 1010-1024 and Modified Routing Attribute 1160 for the single phy. For example, Modified Routing Attribute 1160 may identify a phy to be one of Self Configured (SC), Table Initiator Only IN (TIOI), or Table Initiator Only OUT (TIOO). TIOI may identify an input phy with only SAS initiators listed in the routing table for that phy. TIOO may identify an output phy with only SAS initiators listed in the routing table for that phy.

SAS initiators 1002-1004 may ignore the routing attributes for a phy provided by a SMP DISCOVER response if SMP REPORT MODIFIED PHY ROUTING ATTRIBUTE LIST Response 1120 identifies a Modified Routing Attribute 1160 for the phy. In an embodiment of the present disclosure, the vendor unique SMP function may only report modified routing attributes TIOI, TIOO, and SC. SAS expanders 1010-1024 may have a plurality of ports with some possessing standard routing attributes (D, S, T) and some possessing modified routing attributes (TIOI, TIOO, SC).

SAS expanders 1010-1024 may be configured to have a primary subtractive port defined to be an IN and an OUT pair. Both the input port and the output port of the subtractive port may require the addresses of SAS initiators 1002-1004 in the route table for that port. Further, SAS expanders may add a secondary subtractive port for direct attached devices. For example, an OPEN received on the input port may be sent out the output port for that subtractive port if the DEST of the OPEN, as provided via SMP, is not a direct attached device (ex—a device attached to a port with a D routing attribute) or if the DEST of the OPEN is not in the route table for the input port. For example, an OPEN received on the output port may be sent out the input port for that subtractive port if the DEST of the OPEN is not a direct attached device (ex—a device attached to a port with a D routing attribute) or if the DEST of the OPEN is not in the route table for the output port. The modified routing attribute TIOI may indicate the input port of a subtractive port. The modified routing attribute TIOO may indicate the output port of a subtractive port. OPENs may always default to the primary subtractive port.

SAS initiators 1002-1004 may be located at the top or the bottom of cascaded SAS topology 1000. SAS initiators 1002-

1004 may program only their own SAS addresses into the route tables of TIOI ports 1060 and TIOO ports 1050 of the SAS expanders 1010-1024 of cascaded SAS topology 1000. Further, SAS initiators 1002-1004 may program only their own SAS addresses only into the route tables of TIOI ports 1060 or the route tables of TIOO ports 1050 of the SAS expanders 1010-1024 of cascaded SAS topology 1000, depending on the position of the SAS initiators 1002-1004 within cascaded SAS topology 1000. SAS expanders 1010-1024 may execute firmware preventing SAS initiators 1002-1004 from stepping on each other when programming address into SAS expander route tables (e.g.—position independent route table programming.

SAS target 1070 may issue an OPEN to one of SAS expanders 1010-1024. One of SAS expanders 1010-1024 may locate the DEST address of the OPEN in the route table for one of SAS expanders 1010-1024. The OPEN may be sent to the SAS initiator indicated by the DEST address. In another embodiment, one of SAS initiators 1002-1004 may issue an OPEN to one of SAS expanders 1010-1024. One of SAS expanders 1010-1024 may first search for the DEST address of the OPEN in any directly attached devices. If found, the OPEN is sent to the appropriate directly attached device. If the DEST address of the OPEN is not found in any directly attached devices, one of SAS expanders 1010-1024 may then search for the DEST address of the OPEN in the SAS expander route table. If found, the OPEN is routed to the appropriate SAS initiator. If the DEST address of the OPEN is not found in the SAS expander route table, one of SAS expanders 1010-1024 may then send the OPEN out its paired subtractive port.

Further, in order to perform SAS zoning in SAS cascaded topology 1000, only end expanders in the topology may require checking End expanders may compare the DEST of the phys for direct attached devices to the source zone group in the OPEN command. The comparing behaves as subtractive until reaching the end device expander of the zone.

Figure 12:
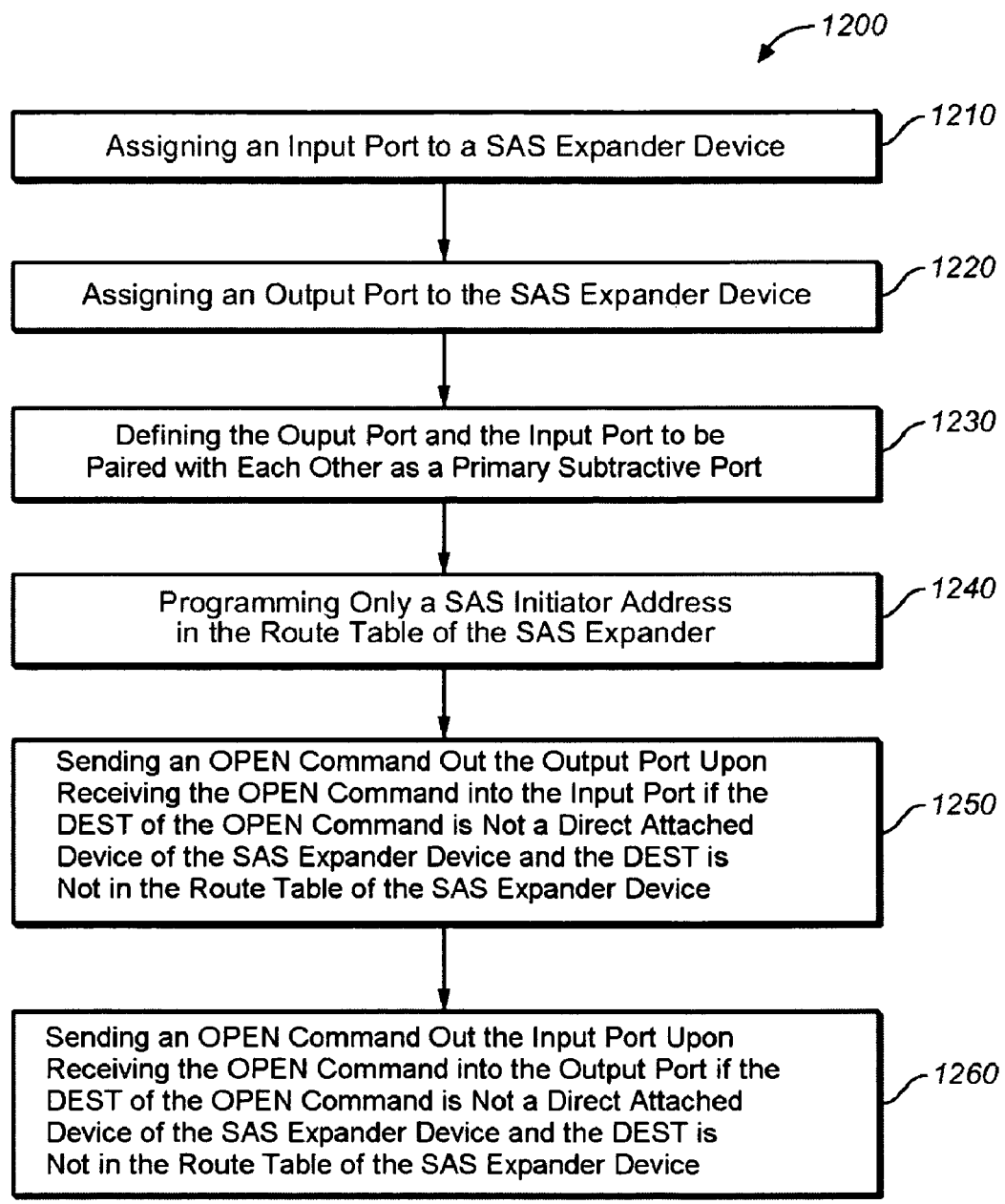
FIG. 12 is a flow diagram illustrating a method of performing paired subtractive routing in a cascaded SAS topology.

Referring generally to FIG. 12, a method for performing paired subtractive routing in a SAS cascaded topology is shown. Method 1200 includes the step of assigning an input port to a SAS expander device 1210. The method 1200 may further include the step of assigning an output port to the SAS expander device 1220. In exemplary embodiments, the method 1200 may further include the step of defining the output port and the input port to be paired with each other to operate as a paired subtractive port 1230. In addition, the method 1200 may include adding a second input port and a second output port to the SAS expander device. The second input port and the second output port may be paired with each other as a secondary subtractive port.

In exemplary embodiments, the method 1200 may further include the step of sending an OPEN command out the output port upon receiving the OPEN command into the input port if the DEST of the OPEN command is not a direct attached device of the SAS expander device and the DEST is not in the route table of the SAS expander device 1250. The method 1200 may further include the step of sending an OPEN command out the input port upon receiving the OPEN command into the output port if the DEST of the OPEN command is not a direct attached device of the SAS expander device and the DEST is not in the route table of the SAS expander device 1260. In addition, sending an OPEN command out the output port upon receiving the OPEN command into the input port if the DEST of the OPEN command is not a direct attached device of the SAS expander device and the DEST is not in the route table of the SAS expander device 1250. The method 1200 may further include the step of sending an OPEN command out the second input port upon receiving the OPEN command into the second output port if the DEST of the OPEN command is not a direct attached device of the SAS expander device and the DEST is not in the route table of the SAS expander device. The method 1200 may further include the step of sending an OPEN command out the second input port upon receiving the OPEN command into the second output port if the DEST of the OPEN command is not a direct attached device of the SAS expander device and the DEST is not in the route table of the SAS expander device. Further, the secondary subtractive port may operate for communication with the direct attached device of the SAS expander device. In addition, an OPEN command may default to the primary subtractive port.

In exemplary embodiments, the method 1200 may further include the step of specifying the subtractive ports of the SAS expander via a modified routing attribute of a vendor unique SMP function. Further, the SAS initiator may ignore the SMP DISCOVER response attribute for the subtractive ports and may use the modified routing attribute of a vendor unique SMP if a modified routing attribute exists for the subtractive ports.

In exemplary embodiments, the method 1200 may further include the step of programming only a SAS initiator address in the route table of the SAS expander 1240. For example, the step of programming only a SAS initiator address in the route table of the SAS expander 1240 may be performed by the SAS expander. Further, the route table of the SAS expander programmed by the SAS expander may be the route table for a self-configuration specified port. The step of programming only a SAS initiator address in the route table of the SAS expander 1240 may be performed by every SAS initiator in the SAS routing topology, each SAS initiator programming only the SAS address for that SAS initiator in the route table of the SAS expander. Further, each SAS initator may only program the SAS address for that SAS initiator in the route table of one type of modified routing attribute port of the SAS expander. The type of modified routing attribute port of the SAS expander may be determined by the position of the SAS initiator in the SAS routing topology. SAS initiators may be located at the top or the bottom of the SAS routing topology.

In the present disclosure, the methods disclosed may be implemented as sets of instructions or software readable by a device. Such software may a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages.

The form described is merely explanatory, and it is the intention of the following claims to encompass and include such changes.

What is claimed is:

1. A method for providing path failover while combining multiple Serial Attached Small Computer System Interface (SAS) expanders to act as a single, cohesive SAS expander, comprising:
assigning an identical SAS address to at least a first SAS expander and a second SAS expander;
detecting a failed link between the first SAS expander and a device due to at least one of a physical or logical problem; and
re-routing a data transfer of the first SAS expander connected to the device via the failed link to the second SAS expander, where the second SAS expander is connected to the device via a functional link,
wherein the first SAS expander is connected to the second SAS expander via phys of the first SAS expander and phys of the second SAS expander for inter-expander communications,
wherein the re-routing a data transfer of the first SAS expander connected to the device via the failed link to a second SAS expander connected to the device via a functional link, wherein the first SAS expander is connected to the SAS expander via the phys of the first SAS expander and the phys of the second SAS expander for inter-expander communications further includes:
reprogramming a route table of the first SAS expander to re-route the data transfer from the failed link to links between the phys of the first SAS expander for inter-expander communications and the phys of the second SAS expander for inter-expander communications.

2. The method of claim 1, wherein the re-routing a data transfer of the first SAS expander connected to the device via the failed link to a second SAS expander connected to the device via a functional link, wherein the first SAS expander is connected to the SAS expander via the phys of the first SAS expander and the phys of the second SAS expander for inter-expander communications further includes:
re-routing the data transfer of the first SAS expander connected to the device to the second SAS expander connected to the device via the functional link via the phys of the first SAS expander for inter-expander communications and the phys of the second SAS expander for inter-expander communications.

3. The method of claim 1, wherein the reprogramming is performed via firmware on the first SAS expander.

4. The method of claim 1, wherein the re-routing the data transfer of the first SAS expander connected to the device via the failed link to the second SAS expander connected to the device via the functional link does not indicate to SAS initiators and SAS targets connected to the single, cohesive SAS expander that such re-routing is occurring.

5. The method of claim 1, wherein the re-routing a data transfer of the first SAS expander connected to the device via the failed link to a second SAS expander connected to the device via a functional link, wherein the first SAS expander is connected to the SAS expander via the phys of the first SAS expander and the phys of the second SAS expander for inter-expander communications further includes:
responding with an arbitration in progress response from the first SAS expander connected to the device via the failed link if the second SAS expander connected to the device via the functional link already has an active link to the device.

6. The method of claim 5, wherein the responding with an arbitration in progress response from the first SAS expander connected to the device via the failed link if the second SAS expander connected to the device via the functional link already has an active link to the device further includes:
retrying the re-routed data transfer at a later time by a SAS initiator requesting the re-routed data transfer and receiving the arbitration in progress response.

7. The method of claim 1, further including:
wherein a SAS initiator connected to the single, cohesive SAS expander receiving a notification the failed link exists via receiving a CHANGE primitive.

8. The method of claim 7, wherein the SAS initiator connected to the single, cohesive SAS expander performs a SAS Discovery upon receiving the CHANGE primitive.

9. A system, comprising:
means for combining multiple SAS expanders to act as a single, cohesive SAS expander, where at least a first SAS expander and a second SAS expander share an identical SAS address;
means for detecting a failed link between the first SAS expander and a device due to at least one of a physical or logical problem; and
means for re-routing a data transfer of the first SAS expander connected to the device via the failed link to the second SAS expander, where the second SAS expander is connected to the device via a functional link, wherein the first SAS expander is connected to the second SAS expander via phys of the first SAS expander and phys of the second SAS expander for inter-expander communications, wherein the means for re-routing a data transfer of the first SAS expander connected to the device via the failed link to a second SAS expander connected to the device via a functional link, wherein the first SAS expander is connected to the SAS expander via the phys of the first SAS expander and the phys of the second SAS expander for inter-expander communications further includes:
means for reprogramming a route table of the first SAS expander to re-route the data transfer from the failed link to links between the phys of the first SAS expander for inter-expander communications and the phys of the second SAS expander for inter-expander communications.

10. The system of claim 9, wherein the means for re-routing a data transfer of the first SAS expander connected to the device via the failed link to a second SAS expander connected to the device via a functional link, wherein the first SAS expander is connected to the SAS expander via the phys of the first SAS expander and the phys of the second SAS expander for inter-expander communications further includes:
means for re-routing the data transfer of the first SAS expander connected to the device to the second SAS expander connected to the device via the functional link via the phys of the first SAS expander for inter-expander communications and the phys of the second SAS expander for inter-expander communications.

11. The system of claim 9, wherein the means for re-routing the data transfer of the first SAS expander connected to the device via the failed link to the second SAS expander connected to the device via the functional link does not indicate to SAS initiators and SAS targets connected to the single, cohesive SAS expander that such re-routing is occurring.

12. The system of claim 9, wherein the means for re-routing a data transfer of the first SAS expander connected to the device via the failed link to a second SAS expander connected to the device via a functional link, wherein the first SAS expander is connected to the SAS expander via the phys of the first SAS expander and the phys of the second SAS expander for inter-expander communications further includes:

means for responding with an arbitration in progress response from the first SAS expander connected to the device via the failed link if the second SAS expander connected to the device via the functional link already has an active link to the device.

13. The system of claim 12, wherein the means for responding with an arbitration in progress response from the first SAS expander connected to the device via the failed link if the second SAS expander connected to the device via the functional link already has an active link to the device further includes:

means for retrying the re-routed data transfer at a later time by a SAS initiator requesting the re-routed data transfer and receiving the arbitration in progress response.

14. The system of claim 9, further including:

means for a SAS initiator connected to the single, cohesive SAS expander receiving a notification the failed link exists via receiving a CHANGE primitive.

15. The system of claim 14, further including:

means for performing a SAS Discovery upon a SAS initiator connected to the single, cohesive SAS expander receiving the CHANGE primitive.

16. A non-transitory computer-readable medium having computer-executable instructions for performing a method for providing path failover while combining multiple Serial Attached Small Computer System Interface (SAS) expanders to act as a single, cohesive SAS expander, the method comprising:

assigning an identical SAS address to at least a first SAS expander and a second SAS expander;

detecting a failed link between the first SAS expander and a device due to at least one of a physical or logical problem; and re-routing a data transfer of the first SAS expander connected to the device via the failed link to the second SAS expander, where the second SAS expander is connected to the device via a functional link, wherein the first SAS expander is connected to the SAS expander via phys of the first SAS expander and phys of the second SAS expander for inter-expander communications wherein the re-routing a data transfer of the first SAS expander connected to the device via the failed link to a second SAS expander connected to the device via a functional link, wherein the first SAS expander is connected to the SAS expander via the phys of the first SAS expander and the phys of the second SAS expander for inter-expander communications further includes:

reprogramming a route table of the first SAS expander to re-route the data transfer from the failed link to links between the phys of the first SAS expander for inter-expander communications and the phys of the second SAS expander for inter-expander communications.

\* \* \* \* \*